United States Patent [19]

Ogasawara

[11] Patent Number: 4,460,257

[45] Date of Patent: Jul. 17, 1984

[54] FOCUS REGULATING DEVICE FOR CAMERA WITH AUTOMATIC EXPOSURE CONTROL

[75] Inventor: Akira Ogasawara, Yokohama, Japan

[73] Assignee: Nippon Kogaku K.K., Tokyo, Japan

[21] Appl. No.: 480,494

[22] Filed: Mar. 30, 1983

[30] Foreign Application Priority Data

Apr. 3, 1982 [JP] Japan ................................ 57-54793

[51] Int. Cl.³ .......................... G03B 3/10; G03B 7/091
[52] U.S. Cl. ...................................... 354/402; 354/432
[58] Field of Search ............................... 354/402–409, 354/410, 429, 432

[56] References Cited

U.S. PATENT DOCUMENTS

| | | | |
|---|---|---|---|
| 4,240,726 | 12/1980 | Wick | 354/407 |
| 4,324,463 | 4/1982 | Lermann et al. | 354/408 |
| 4,346,975 | 8/1982 | Isono | 354/405 |
| 4,387,975 | 6/1983 | Araki | 354/403 |

Primary Examiner—William B. Perkey
Attorney, Agent, or Firm—Shapiro and Shapiro

[57] ABSTRACT

A focus regulating device adapted for use in a camera with automatic exposure control and capable of exposure control and automatic focus regulation within a limited time, fully utilizing the capability of a microcomputer. In the device, the data processings for exposure control and for automatic exposure regulation are executed, for example in a microcomputer, by interruption process, wherein the processing for exposure control is inhibited during the read-out, A/D conversion and latching of the distance information.

5 Claims, 3 Drawing Figures

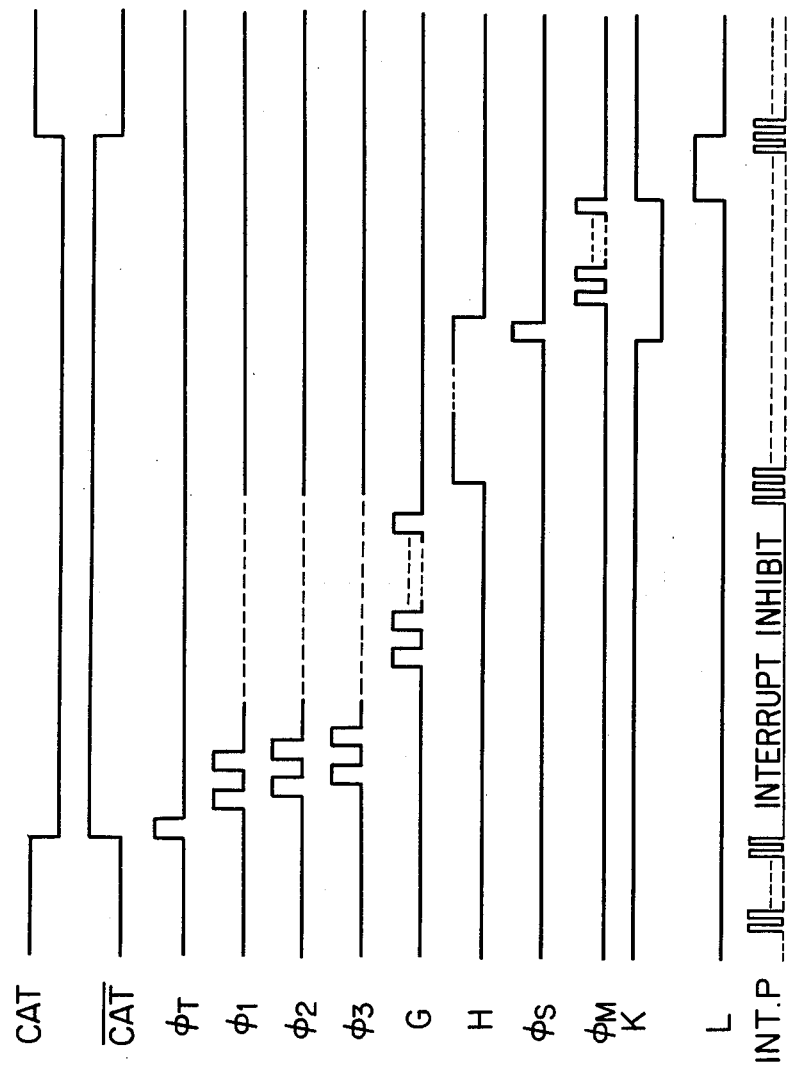

FOCUS REGULATING DEVICE FOR CAMERA WITH AUTOMATIC EXPOSURE CONTROL

BACKGROUND OF THE INVENTION

1. Field of the Invention

The present invention relates to a focus regulating device for use in a camera with automatic exposure control utilizing a data processing unit such as a microcomputer.

2. Description of the Prior Art

Recent remarkable progress in data processing unit such as microcomputer and in digital devices such as analog-to-digital converter has stimulated the use of a microcomputer in a camera for exposure control and also for control of various mechanisms such as mirror and shutter. Also the commercialization of charge-coupled devices has rendered the use of microcomputer effective also for the detection of focus state and for the automatic focus control. These trend naturally lead to an idea of utilizing a single microcomputer for exposure control, sequence control of mechanisms, focus detection and automatic focus regulation.

It is however particularly difficult to achieve the exposure control and the automatic focus regulation with a single microcomputer since these two functions are least compatible in terms of data receiving time and processing time. More specifically, in case of automatic focus regulation with a charge accumulating photoelectric converter such as charge-coupled device as the range-finding sensor, there will be at first required a step of charge accumulation. The period required for said charge accumulation has to be regulated in response to the luminance of the object, in order to maintain a constant output level from the photoelectric converter. As an example said period can vary from several milliseconds for a high object luminance to several hundred milliseconds for a low object luminance. Then required is a charge transfer step, during which the charges accumulated in the aforementioned manner are time sequentially released. Subsequently there will be a step of latching thus transferred charges, and a step of calculating and regulating the focus, based upon the latched charges as the distance informations. On the other hand, in the exposure control there will be required a step of latching the output signal of light measurement and a step of exposure calculation. Serial execution of these steps of focus regulation and exposure control will lead to an unacceptably long processing time.

SUMMARY OF THE INVENTION

The object of the present invention is to provide a focus regulating device adapted for use in a camera with automatic exposure control and capable of exposure control and automatic focus regulation within a limited time, fully utilizing the capability of a microcomputer.

The above-mentioned object can be achieved, in the present invention, by a device in which the data processings for exposure control and for automatic exposure regulation are executed, for example in a microcomputer, by interruption process, wherein the processing for exposure control is inhibited during the read-out, A/D conversion and latching of the distance information.

BRIEF DESCRIPTION OF THE DRAWINGS

FIG. 3 is a timing chart showing the function of the embodiment shown in FIG. 1.

DETAILED DESCRIPTION OF THE PREFERRED EMBODIMENTS

Now the present invention will be clarified in detail by an embodiment shown in the attached drawings.

Figure 1:
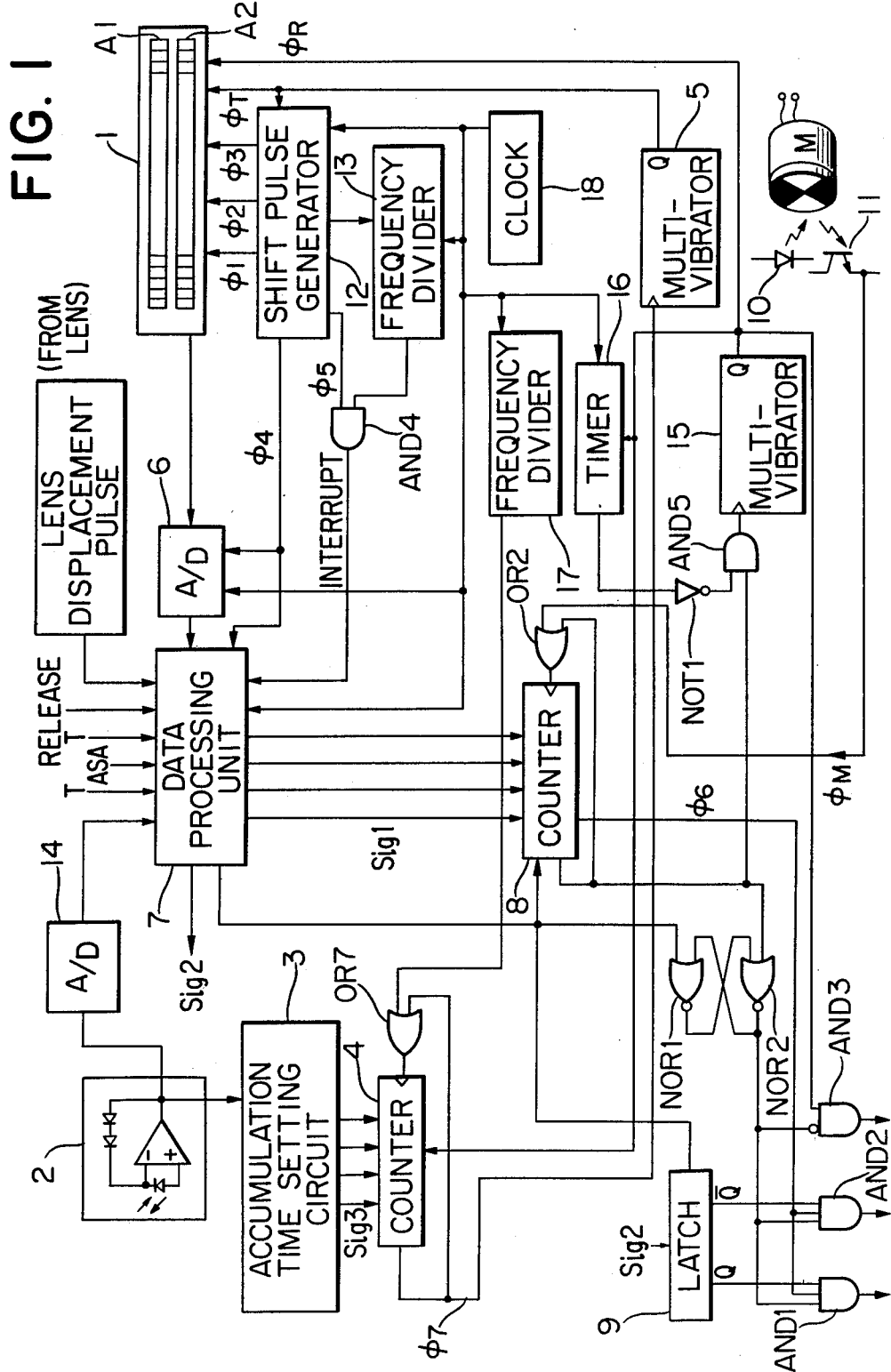
FIG. 1 is a block diagram showing an embodiment of the present invention.

FIG. 1 shows a camera control device embodying the present invention, wherein a distance sensor 1 accumulates charges corresponding to the amount of light coming from an object, and the time of said charge accumulation is determined by a charge accumulating time determining circuit 3 in response to the luminance of the objected measured by a light-metering unit 2. Upon expiration of said time a programmable counter 4 completes counting operation to send, through a monostable multivibrator 5, a transfer pulse $\phi T$ to the sensor 1, thereby initiating the transfer of the charges accumulated in said sensor 1. The charges thus transferred are subjected to A/D converter by an A/D converter 6 and latched in a data processing unit 7. Said unit 7 calculates an output signal for focus regulation, and said signal is transmitted to the motor driving circuit 2, through a programmable counter 8, NOR gates NOR1, NOR2, a latch 9 and AND gates AND2, AND3. Thus a motor M drives an unrepresented photographing lens to an infocus position with respect to the object. The replacement of said lens by the motor is transmitted, as a feedback signal, through an LED10, a photodiode 11 and an OR gate OR2. Also said lens supplies representing the amount of lens displacement to the processing unit 7. A shift pulse generator 12 generates 3-phase shift pulses to cause charge transfer from the sensor 1. A frequency divider 13 supplies periodic interruption pulses to the processing unit 7 through an AND gate AND4, with such a frequency enough for sufficiently responding to the change in the luminance of the object. On the other hand, an output signal supplied from a light metering unit 2 in response to the luminance of the object is subjected to analog-to-digital conversion in an A/D converter 14 and is supplied to the processing unit 7, in synchronization with said interruption pulse, for calculating an output signal for exposure control. The generation of said interruption pulses is inhibited by the AND gate AND4 in response to a signal $\phi 5$ from the 3-phase shift pulse generator 12, during the transfer of accumulated charges of the sensor 1, the A/D conversion and the latching of thus A/D-converted output signal. Said shift pulse generator 12 identifies the above-mentioned periods of inhibition of interruption signals by counting clock pulses from a clock pulse generator 18 and accordingly controls said signal $\phi 5$. A monostable multivibrator 15 controls the sensor and the motor M, and is in turn controlled by a timer 16, an inverter NOT1 and an AND gate AND5. A frequency divider 17 and an OR gate OR1 generate reference pulses to be counted by a programmable counter 4. The clock pulse generator 18 supplies clock pulses to various units of the circuit.

Figure 2:
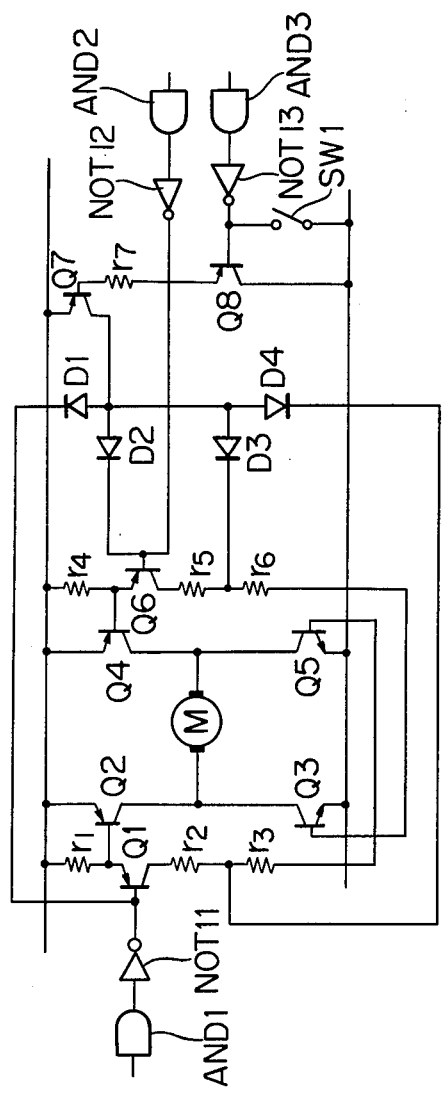
FIG. 2 is a circuit diagram of a motor driving circuit.

FIG. 2 shows a motor driving circuit comprising transistors Q1-Q8, diodes D1-D4, resistors r1-r7 and a switch SW1, receiving focus regulating signals, through inverters NOT11–NOT13, from AND gates AND-1–AND3 shown in FIG. 1. In case the gate AND1 releases a high-level output signal while the gates AND2 and AND3 release low-level output signals, said signals are respectively inverted by inverters NOT1-1–NOT13, whereby the transistors Q1, Q2 and Q5 are turned on while the transistors Q3, Q4 and Q6 turned off. Thus the motor M is energized through the transistors Q2 and Q5 and is rotated in the forward direction. Then, in case the AND gate AND2 releases a high-level output signal while the AND gates AND1 and AND3 release low-level output signals, the transistors Q1, Q2 and Q5 are turned off while the transistors Q3, Q4 and Q6 are turned on, whereby the motor M is energized through the transistors Q3, Q4 and is rotated in the inverse direction. Then in case the AND gate AND3 releases a high-level output signal, the transistors Q8, Q7 are at first turned on. Thus through said transistor Q7 and also through the diodes D1, D2, there is applied, between the bases and emitters of the transistors Q1, Q6, a voltage lower than a threshold value for turning on said transistors, whereby the transistors Q1, Q2, Q4, Q6 remain turned off. On the other hand the transistors Q3, Q5 receive base currents enough for turning on said transistors through the transistor Q7, diodes D3, D4 and resistors r3, r5, whereby said transistors Q3, Q5 are turned on. In this manner the motor M is deactivated. The switch SW1 functions as the focus locking switch and, if turned on when the lens reaches the in-focus position in the automatic focusing mode, inhibits the lens drive thereafter, thus maintaining the focus state when the switch SW1 is actuated.

Now reference is made to a timing chart shown in FIG. 3, explaining the function of the present embodiment. In FIG. 3, a curve CAT represents the charge accumulating time of the distance measuring sensor 1, which accumulates the charges during the high-level state of said curbe. Upon expiration of a charge accumulating time of the sensor 1 appropriately determined by the circuit 3 in response to the output level of the light measuring unit 2 representing the luminance of the object, the programmable counter 4 completes the pulse counting operation to shift an output signal thereof from the low-level state to the high-level state as shown by a curbe $\overline{CAT}$ in FIG. 3 thereby triggering the multivibrator 5. Consequently said multivibrator 5 supplies a transfer pulse $\phi T$ to the sensor 1, thereby causing the transfer of the charges accumulated in a photosensor element A1 to a transfer resistor A2. Said pulse $\phi T$ then triggers the shift pulse generator 12, which thus generates 3-phase shift pulses $\phi 1$–$\phi 3$ in FIG. 3, for sequentially transferring the charges previously transferred to the transfer register A2 to an output stage of the sensor 1. The accumulated charge signals sequentially released from the sensor 1 are subjected, in synchronization with said transfer, to A/D conversion by the A/D converter 6 as represented by a curve G in FIG. 3, and then are transferred to and latched in the processing unit 7. The shift pulse generator 12 generates timing pulses $\phi 4$ required in the A/D converter 6 and the processing unit 7. During a period from the generation of the pulse $\phi T$ to the transfer of the A/D converted output signal corresponding to the last photosensor element of the sensor 1 to the processing unit 7, the pulse generator 12 resets the frequency divider 13. During said period the frequency divider 13 releases a low-level output signal, and the shift pulse generator 12 releases a low-level output signal $\phi 5$. Consequently the entry of an interruption pulse, as represented by a curve INT.P in FIG. 3, in the processing unit 7 from the frequency divider 13 through the AND gate AND4 is inhibited during the latching operation of the A/D-converted output signal by said processing unit 7. The processing unit 7 has a function of calculating a control output signal for automatic focus regulation and a function of calculating an output signal for exposure control, and in the following there will be explained the automatic focus regulating function.

Upon completion of the calculation of output signal for automatic focus regulation in response to the A/D-converted output signals of the sensor 1, the processing unit 7 releases the results of said calculation and a strobe pulse $\phi S$ in FIG. 3 for latching said results. Said calculation and the release of the results of calculation are conducted during the high-level state of a curve H in FIG. 3. Said output results include information on the amount and direction of lens displacement required for focusing. The information on the amount of lens displacement is represented by a 4-bit binary signal Sig-1, while the information on the direction of lens displacement is represented by a flag Sig-2, which assumes the high-level or low-level for example respective when the lens is advanced or retracted.

Said calculation can for example be carried out according to a method disclosed in the U.S. Pat. No. 4,264,810. In response to the strobe pulse $\phi S$ from the processing unit 7, the latch 9 latches the signal Sig-2 to release a high-level output signal Q and a low-level output signal $\overline{Q}$ when the signal Sig-2 is at the high-level state. A programmable counter 8 latches the signal Sig-1 in response to the entry of the strobe pulse $\phi S$ from the processing unit 7. Said programmable counter 8 continues to release a high-level output signal upon termination of the counting operation at the end of the preceding servo operation, but, as shown by a curve K in FIG. 3, such state is cancelled to start to release a low-level output signal upon latching a new result of calculation, except in the in-focus state. An R-S flip-flop composed of NOR gates NOR1, NOR2 continues to release a low-level output signal from said gate NOR2 since the termination of counting of the programmable counter 8 at the end of preceding servo operation but starts to release a high-level output signal from said gate NOR2 in response to the strobe pulse $\phi S$. Consequently the signal Sig-2, which is released from the processing unit 7 simultaneously with the result of calculation and is latched by the latch 9, is enabled and released through the AND gates AND1, AND2. As explained before, the motor M rotates in the normal direction to advance the lens when the gates AND1, AND2 respectively release the high-level and low-level output signals. On the other hand, the motor M rotates in the inverse direction to retract the lens when said gates respectively release the low-level and high-level output signals. The amount of displacement of said lens is detected by reflecting the light from a light-emitting diode 10 with a black-and-white pattern mounted on the shaft of said motor M and converting the reflected light into pulses $\phi M$ in FIG. 3 by means of a phototransistor 11. Said pulses $\phi M$ are supplied through an OR gate OR2 and are counted by the programmable counter 8, which supplies a high-level output signal to the gate NOR2 when said count coincides with the number of pulses of the signal Sig-1. Also immediately before the count of the pulses $\phi M$ becomes equal to the number of pulses Sig-1, the programmable counter 8 generates speed modulating pulses φ6, of which duty ratio gradually changes in such a manner that the ratio of the high-level state to the low-level state gradually decreases with the progress of the count of the pulses φM. Consequently, the motor M initially is driven at a full speed through the gates AND1, AND2, but gradually reduces the rotating speed when the pulses φ6 become generated since the motor M becomes energized intermittently. In this manner the displacing speed of the lens becomes lower as the lens approaches the in-focus position.

Upon completion of the counting operation of the programmable counter 8, there is generated a high-level output signal to terminate the entry of the pulses φM to said counter through the gate OR2. Also in response to the high-level output signal of the programmable counter 8, the gate NOR2 releases a low-level output signal to close the gates AND3, AND4, thereby terminating the power supply to the motor M.

On the other hand, as shown by a curve L in FIG. 3, the monostable multivibrator 15 is triggered at the shifting of the triggering input signal from the low-level to the high-level state, thereby releasing a high-level output signal Q for a determined period. The timer circuit 16 is reset by said high-level output signal Q, and is then set, at the shift of said output signal Q to the low-level, to start the time measurement. Said timer circuit 16 continues to release a low-level output signal during said time measurement, which is effected by counting the clock pulses from the clock pulse generator 18. The output signal of the timer 16 is supplied, after inversion by the inverter NOT1, to the AND gate AND5, which therefore generates a high-level output signal in response to the high-level output signal from the programmable counter 8, thereby triggering the monostable multivibrator 15. Said multivibrator 15 releases a brake pulse φR for a determined period, whereby the gate AND3 releases a high-level output signal during the high-level state of the output signal Q of said multivibrator 15, whereby applying electromagnetic brake to the motor M, in order to avoid excessive displacement of the lens caused by the inertial rotation of the motor M after the termination of the power supply thereto.

The timer 16 is reset by the high-level output signal Q of the monostable multivibrator 15 and starts the time measurement again at the shifting of said output signal Q to the low-level state. Also the sensor 1 starts the charge accumulation at the trailing end of the reset pulse φR from said multivibrator 15. On the other hand the light metering unit 2 measures the luminance of the object, and the obtained output signal is converted, by the charge accumulating time determining circuit 3 of the sensor 1, into a 4-bit binary code Sig-3 corresponding to a determined charge accumulating time. Said signal Sig-3 is supplied to the programmable counter 4 in synchronization with the start of the reset pulse φR, and, when the charge accumulation is initiated by said pulse φR, the clock pulses from the clock pulse generator are supplied, after suitable frequency division by the frequency divider 17, to the programmable counter 4 through the gate OR2. Then, when the count of said clock pulses coincides with the number of pulses in the signal Sig-3, the programmable counter 4 releases a high-level output pulse φ7 to disable the gate OR1 and to trigger the monostable multivibrator 5.

In this manner the device returns to the original state.

The timer circuit 16 maintains the low-level output signal as it is periodically reset by the reset pulses φR and only functions when the lens reaches or originally is in the in-focus position. The signals Sig-1, Sig-2, released with the strobe pulse φS by the processing unit 7 after the arrival at the in-focus position, do not activate the motor M, so that the programmable counter 8 remains in the count-up state immediately before and after the generation of said strobe pulse φS. Consequently the monostable multivibrator 15 does not receive the triggering signal after the lens is focused. It is therefore necessary to re-start the device in order not to interrupt the function thereof. For this purpose, after the lapse of a determined period from the termination of reset pulses φR from the monostable multivibrator 15 by the lens focusing, the timer circuit 16 releases a high-level timer pulse, which is supplied to the gate AND5 after inversion by the inverter NOT1. As the programmable counter 8 releases a high-level output signal in this state, the monostable multivibrator 15 is triggered at the shifting of negative inverted timer pulse to the high-level state, thus releasing the reset pulse φR. The period from the arrival at the in-focus state to the restarting is selected slightly longer than a period required by the lens for moving from a lens position corresponding to the infinite object position to a lens position corresponding to the nearest object position. In case the in-focus state is confirmed by the calculation in the processing unit 7, it is also possible to directly trigger the gate AND5 through another signal line, instead of releasing the result of calculation and the strobe pulse φS, thereby supplying the reset pulse to the sensor 1 and initiating the succeeding accumulation step. The details of such structure will be readily understandable and are therefore omitted.

In the present embodiment the processing unit 7 releases the result of calculation for automatic focus regulation in the form of a binary signal, and the absolute value of the lens displacement in the form of a 4-bit signal, but the result of said calculation should be suitable adjusted since the amount of rotation of the motor M or displacement of the lens is different for each interchangeable lens. For this reason the processing unit 7 reads the amount of displacement per pulse from each lens and suitable corrects the output signal.

In addition to the data processing for the automatic focus regulation, the processing unit 7 has a function of data processing for exposure control. Since the period required for data processing for exposure control is generally far shorter than that required for the automatic focus regulation, it is desirable to repeat the calculation for the exposure control in response to the A/D converted output signals and to renew the corresponding display during the course of the data processing for automatic focus regulation. Consequently, the output pulses of the clock pulse generator 18 are subjected to frequency division by the frequency divider 13 to obtain pulses of a determined interval, which are utilized as interrupting pulses for the processing unit 7, thus conducting the calculation for the exposure control in the course of the calculation for the automatic focus regulation. However, as explained in the foregoing, such interruption is inhibited by the gate AND4, during the A/D conversion of the output signals of the sensor 1 and the entry of said signals to the processing unit 7. The necessary data for exposure control, such as the lens aperture F, shutter sensitivity ASA, shutter speed T and output signal of light metering are read at each interruption. The output signal of light metering can be obtained from the light metering unit 2 or from another independent unit. An independent light metering unit is desirable in the strict sense since the light-receiving area the light metering unit for the purpose of regulating the charge accumulating time of the sensor is much narrower than that of the light metering unit for the purpose of exposure control. However these two light metering units may be united together for the purpose of simplicity. The above-described procedure is effected in response to the actuation of a shutter button over a first stroke. The shutter releasing, achieved by the actuation of said shutter button over a second stroke, is transmitted to the processing unit 7 as an interruption of the highest priority. The presence of said interruption is checked prior to the checking of the data entry from the A/D converter 14 or of the interruption for exposure control, and, in the presence of such high-priority interruption, a calculation for exposure control is executed to determine appropriate shutter speed and lens aperture, thereby exposing a photographic film or a photosensor. In the foregoing explanation the initializing steps at the start of power supply have been omitted. At the start of power supply, the NOR gate NOR2 releases a low-level signal to deactivate the motor M, and the reset pulse $\phi R$ is supplied to the sensor 1 for initiating the charge accumulation. Simultaneously the counting of the accumulating time is initiated by the programmable counter 8.

Although the present invention has been explained by an embodiment utilizing the processing unit 7 and peripheral circuits, it will be apparent that most of said circuits can be replaced by a microcomputer and an appropriate program with interruption functions. For such interruption there may be employed a timer counter requesting an interruption after the lapse of a preset time and replacing the function of the programmable counter 4 and an event counter requesting an interruption after counting the pulses of a preset number and replacing the function of the programmable counter 8. Also for the interruption for exposure control there can be employed an interruption by the timer counter. Also an interruption in the program may be used for the same purpose.

I claim:

1. A still camera equipped with means for focusing an image of an object on a determined plane and means for controlling the exposure to light of photosensitive means provided on said determined plane, comprising:
   means for detecting the state of the image of the object on said determined plane and releasing a corresponding detection signal;
   calculating means for storing said detection signal and calculating the positional relationship between said determined plane and the object image formed by said focusing means in response to said stored detection signal;
   means for supplying interruption signals to said calculating means at a determined period;
   wherein said calculating means comprises means for effecting calculation for controlling the exposure of said photosensitive means according to the luminance of the object and in response to said interruption signals; and
   means for inhibiting said interrupt signal at least during a period from the release of said detection signal by said detecting means to the storage of said detection signal by said calculating means.

2. A still camera according to claim 1, wherein said detecting means comprises:
   plural elements positioned on a plane optical substantially equivalent to said determined plane and capable of accumulating charges corresponding to the light intensity distribution of the object image on said equivalent plane;
   means for determining a time necessary for charge accumulation in said plural elements in response to the luminance of the object and generating an end signal for terminating said charge accumulation upon expiration of the charge accumulation in said plural elements during said determined time;
   means for shifting and time-sequentially releasing the charges accumulated in said plural elements in response to said end signal; and
   means for binary encoding the output signal of said shifting means thereby generating said detection signal;
   wherein said inhibiting means is adapted to inhibit said interruption signals in response to said end signal and to cancel said inhibition in response to the storage of said detection signal in said calculating means.

3. A still camera according to claim 1, wherein said calculating means is adapted to release a position signal representing the positional relationship between said object image and said determined plane, and said still camera further comprises means for driving said focusing means in such a direction that the object image becomes focused on said determined plane.

4. A still camera equipped with means for focusing an image of an object on a determined plane and means for controlling the exposure to light of photosensitive means provided on said determined plane, comprising:
   means for effecting, at a determined interval, calculation for exposure control of said photosensitive means in response to the luminance of the object;
   means for detecting the state of the image of the object on said determined plane and releasing a detection signal;
   wherein said effecting means comprises calculating means for storing said detection signal and calculating the positional relationship between said determined plane and the object image formed by said focusing means in response to said stored detection signal; and
   means for inhibiting said calculation for exposure control of said photosensitive means by said effecting means at least during a period from the release of said detection signal by said detecting means to the storage of said detection signal by said calculating means.

5. A still camera according to claim 4, wherein said means for releasing detection signal comprises:
   means for detecting the state of the image of the object on said determined plane; and
   means for transferring said detection signal representing the state of the object image thus detected to said calculating means.

* * * * *